United States Patent Office 3,435,351
Patented Mar. 25, 1969

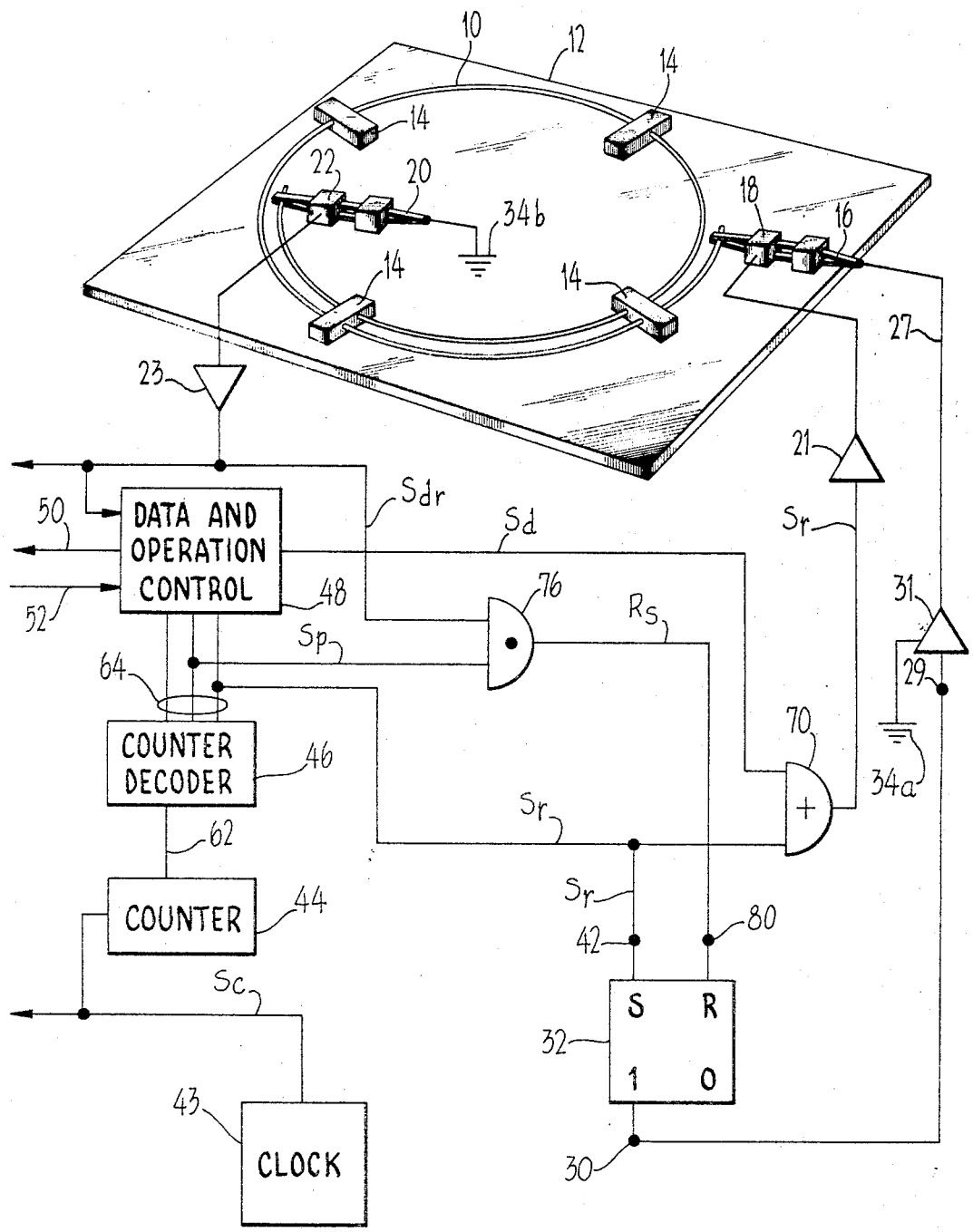
FIG_1

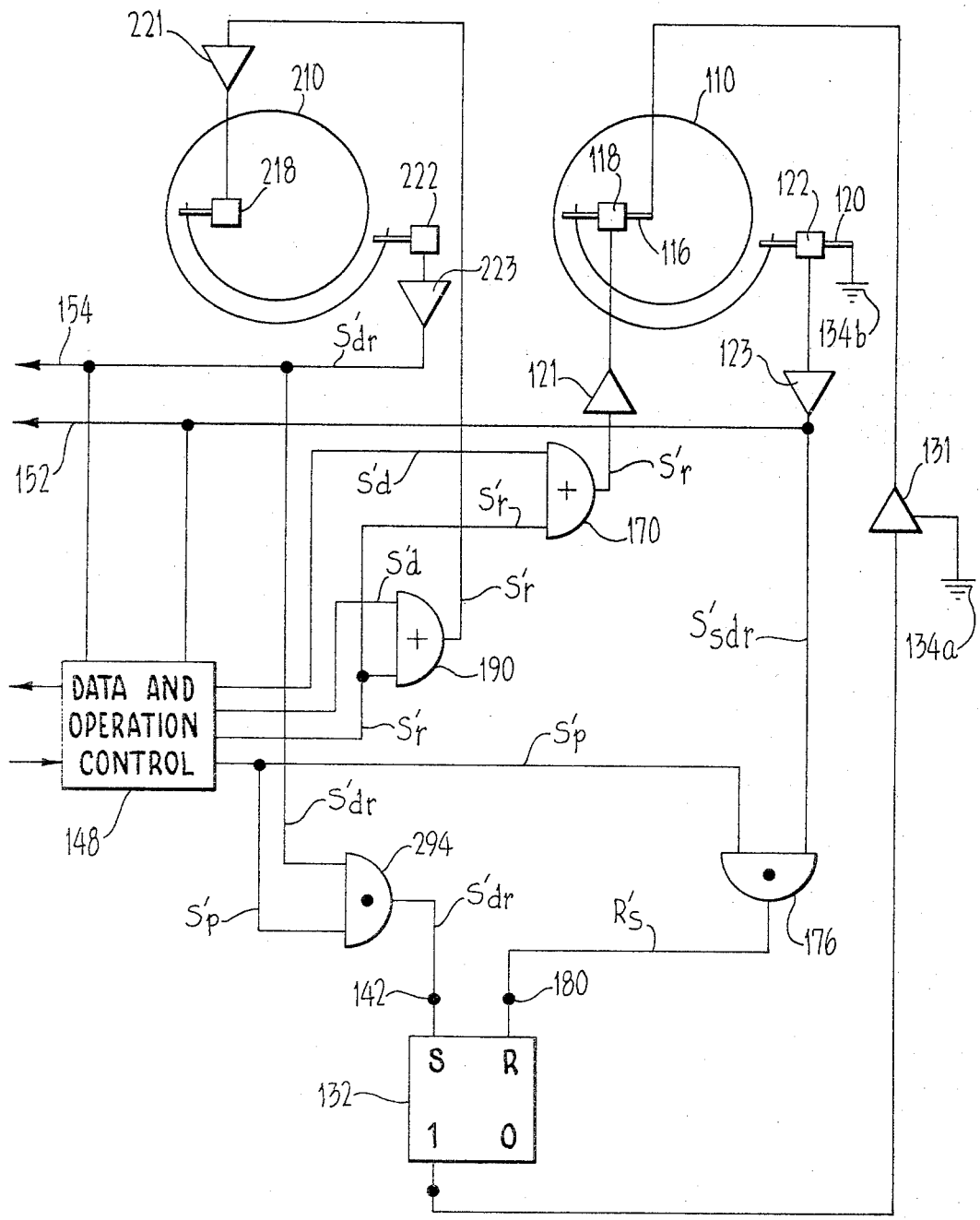
FIG_2

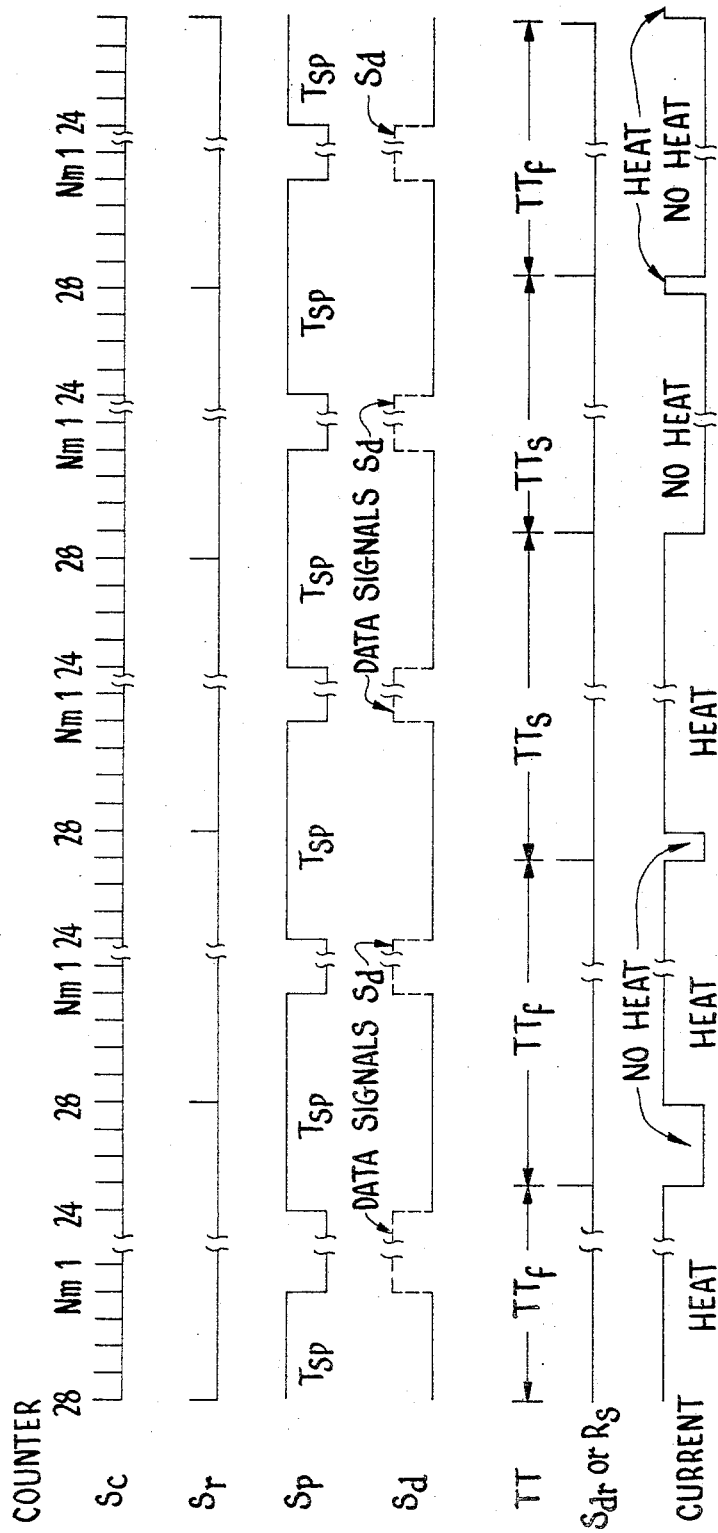
FIG_3

3,435,351
DELAY LINE TRANSIT TIME CONTROL SYSTEM
Robert A. Ragen, Hayward, Calif., assignor to Friden, Inc., a corporation of Delaware
Continuation-in-part of application Ser. No. 457,584, May 21, 1965. This application May 1, 1967, Ser. No. 635,202
Int. Cl. H03k 5/159
U.S. Cl. 328—56      8 Claims

ABSTRACT OF THE DISCLOSURE

The transit time of pulses through an ultrasonic delay line is adjusted so as to be synchronized with recurring reference pulses. The reference pulses are applied to a control means for turning on a source of heat to the delay line. Periodic pulses in phase with the reference pulse are applied to the input of the delay line. The output of the delay line is applied to the control means to turn off the current to the delay line. Means for inhibiting turn off of the control means during transit of data signals through the delay line is included to render the system operative with an electronic data processing and handling system.

This application is a continuation-in-part of my copending application, Ser. No. 457,584, filed May 21, 1965, now abandoned.

BACKGROUND

Field of invention

The present invention pertains to a system for varying the effective transist time of an ultrasonic delay line, and more particularly relates to a novel means for applying controlled amounts of heat to a delay line to thereby vary the transit time of an ultrasonic pulse through the delay line.

Prior art

The transit or delay time of an ultrasonic wave or signal (hereinafter referred to as an acoustic signal) propagated along an ultrasonic delay line of the type shown and described in U.S. Patent 3,241,090 is dependent upon the dimensions and heat content of the delay line and other factors not pertinent to the present invention. Some delay lines which are not comprised of a temperature insensitive material will expand or increase in dimensions upon an increase in temperature and will contract or decrease in dimensions upon a decrease in temperature. Thus a change in heat content and length of such a delay line due to a change in temperature of the delay line will effect a change in the transit time of an acoustic signal through or along the delay line.

Electronic systems utilizing an ultrasonic delay line usually include a generator of a train of electric signals, or at least one regularly recurring pulse at a predetermined period for use in the control and data manipulation circuits of the system; such circuits include the delay line. It is, therefore, desirable and necessary in such systems that the transit time of acoustic signals through the delay line be in substantial synchronization with the generation of the mentioned signal train or recurring pulse.

It is, of course, well known in the electronic arts that a change in temperature of the components of a signal generator oftentimes has the effect of changing the frequency of the pulses generated. Of course such frequency changes can be substantially obviated by the economically expensive expedient of including relatively elaborate auxiliary temperature compensating circuits.

SUMMARY

Briefly stated, one embodiment of the present invention which solves the problems of prior art devices as briefly mentioned above is realized by providing for selective application of heat to a coiled ultrasonic delay line mounted in an environment normally cooler than the delay line, to increase the transit time of an acoustic signal passing through the line so as to be substantially synchronized with the recurring reference pulses. Selective application of heat to the delay line is controlled by providing a switch means which turns the heat on to the delay line each time the reference pulse (which also initiates an acoustic signal) is generated and turns the heat off when the acoustic signal exits from the delay line.

In this manner, when the transit time of an acoustic signal through the delay line is less than the time period of generation of the recurring reference pulses, the delay line is heated for the entire transit time duration. Such heating of the delay line will lengthen the delay line or otherwise affect the velocity of propagation of the acoustic signal and thus increase the transit time to more closely match the time period of the recurring reference pulses. The heat generated is dissipated to the delay line's environment at a rate in excess of the rate of heating.

It is, therefore, an object of the present invention to provide a novel means for adjusting the transit time of acoustic signals through an ultrasonic delay line.

The features of novelty that are considered characteristic of this invention are set forth with particularity in the appended claims. The organization and method of operation of the invention may best be understood from the following description when read in connection with the accompanying drawings.

BRIEF DESCRIPTION OF THE DRAWINGS

FIG. 1 is a combined simplified perspective illustration of an ultrasonic delay line and a logic diagram showing one embodiment of the present invention.

FIG. 2 is a combined simplified schematic of two ultrasonic delay lines and a logic diagram showing another embodiment of the present invention.

FIG. 3 is a timing chart showing typical electrical signal patterns effected by various elements of the FIGS. 1 and 2 embodiments.

DESCRIPTION OF THE PREFERRED EMBODIMENT

In FIG. 1 there is shown in simplified form an ultrasonic delay line 10 including input and output transducers and reflection suppressing end portions 16 and 20, respectively, which delay line is mounted in a general spiral configuration on a base member 12 by means of a plurality of mounting blocks 14. Input end 16 of the delay line has coupled thereto a signal input means, or transducer 18, of a type well known in the art to which the present disclosure pertains. The other or output end 20 of the delay line has coupled thereto a signal output means, or transducer 22, also well known in the art.

An electrical signal supplied from an amplifier 21 will cause the input transducer 18 to generate a mechanical disturbance, generally called an acoustic wave or signal, on the input end 16 of the delay line 10. The acoustic signal travels or propagates itself toward the output end 20 of the delay line where it is then sensed by the output transducer 22. The output transducer responds by generating an electrical signal which is amplified by a second amplifier 23.

The transit or propagation time (indicated in FIG. 3 as TT) of an acoustic signal through the delay line 10 is the time required for travel from the input transducer 18 to the output transducer 22. The acoustic signal travels with a finite velocity, primarily dependent or determined by the heat content and the particular material or substance of which the line is comprised. Therefore, the transit time TT is a function of the length of the delay line between the input and output transducers and the temperature of the line.

The actual transit time of an acoustic signal on delay line 10 will vary according to any change in temperature of the delay line itself. Thus, the transit time of the delay line can be controlled or adjusted within a certain range by heat content or temperature control of the delay line.

The delay line 10 of the present invention is intended to be operated in an environment, i.e., surrounding atmosphere, that has a temperature less than or substantially equal to the operating temperature of the line itself. Under such conditions, heat furnished directly to the line will be dissipated or lost from the delay line into the surrounding environment. If the rate of heat loss to the environment is equal to or substantially equal to the rate of direct heating of the delay line, the delay line's temperature will be substantially stabilized at a certain value, and of course the length of the delay line will be stabilized at a certain value, and thus the transit time of an acoustic signal through the line will be substantially stabilized.

An important feature of the present invention is the provision of a means for applying heat to the delay line 10 for increasing its temperature. The heat applying means is shown in the FIG. 1 embodiment as an electrical lead 27, one end of which is electrically secured to the input end 16 of the delay line and the other end of which is electrically connected to an amplifier 31. The amplifier 31 is connected with an output terminal 30 of a switch means 32, shown in the drawing as a schematic illustration of a bistable multivibrator, or flip-flop, well known in the art.

The switch means 32 is of a type that when in one of its two stable states electrical power of a particular voltage and/or polarity is furnished on output lead 30, and when in the other of its two states such power is turned off, i.e., the voltage may be changed or the current shut off. For the purpose of this description it is assumed that power is furnished on output lead 32 when the flip-flop is in its set or "1" state and no power is furnished when in its reset or "0" state. It will be understood by those skilled in the art to which the present disclosure pertains that the symbol for the amplifier 31 of FIG. 1 (and other logic elements such as AND gate 76, OR gate 70, flip-flop 32, etc.) represents a working device including a necessary separate or common power supply (not shown). A common or ground connection for the amplifier 31 is indicated by ground symbol 34a.

As illustrated in the upper left portion of FIG. 1 ground 34b is connected to the output end 20 of the delay line. The delay line 10 is thus part of an electrical circuit between amplifier 31 and ground 34.

In this manner when switch means 32 is turned on, or set, power, in the form of a current from the amplifier 31, flows through the delay line 10. This current flow will cause the delay line to heat up and expand its dimensions. It will be recognized by those skilled in the art that arrangements other than direct flow of current through the delay line may be utilized. For example, other associated means such as a resistance element may be wrapped closely about the delay line, or positioned in a bore provided in the delay line and connected between the amplifier 31 and ground 34.

Another important feature of the present invention is the provision of means for control of heating current through the delay line 10. This is achieved by turning the switch means 32 on at certain times, and turning the switch means 32 off at certain times.

Turn on of the switch means 32 is achieved by an electrical reference signal $S_r$ periodically transmitted to an input or set terminal 42 of switch means 32.

In order to generate the reference pulse there is provided a clock or signal train generator 43, in combination with other logic gates and structures now to be described. The signal train generator may be any one of various well known signal generators which will transmit a continuous train of clock signals $S_c$ at a substantially constant frequency. The frequency of the clock pulses $S_c$ may, however, change due to temperature changes and aging of the electrical circuit components comprising the generator. The frequency of the $S_c$ pulse transmitted by the generator is the frequency against which the transit time of the delay line 10 is to be synchronized as closely as possible. This synchronization is required since the train of $S_c$ pulses are transmitted to and utilized by a data handling system indicated generally in FIG. 1 by counter 44, counter decoder 46, data and operation control 48, and associated signal transmission leads 50 and 52. Each pulse $S_c$ of the train of pulses (indicated in the timing chart FIG. 3) is transmitted from the clock 43 to pulse counter 44.

The pulse counter 44 may be any well known binary or decade counter which counts serial input pulses up to a maximum number $N_m$, and then on the next input pulse resets itself to zero and begins counting over again. The period of time required for the counter to go from zero count to maximum count may be substantially equal to the desired synchronized transit time TT of the delay line 10, as will be more fully explained below.

The count condition of the counter 44 at all times is transmitted to the counter decoder 46 and other logic elements to be described via a transmission cable or channel 62; this channel is shown in FIG. 1 as including three leads or wires but it will be understood that it will include as many electrical wires or leads as required. The counter decoder may be, for example, a set of logic gates and elements so arranged to detect certain count conditions of the counter 44 and to transmit count detected signals via a transmission channel 64 to the data and operation control 48.

Assuming, for the purposes of this description, that counter 44 is a 5-bit binary counter, the maximum count that can be registered or contained in the counter is thirty-one; on the thirty-second count ($N_m$) the counter will automatically return to zero.

The counter decoder 46 may, for example, contain a set of logic gates that will detect a count condition of twenty-four and greater (binary stages or orders $2^4$ and $2^3$ are set, as will be recognized by those skilled in the art) and generate a signal to the data and operation control 48 so long as such count condition is present; such signal is referred to hereinafter as pulse sample signal $S_p$ and is present for a period of time (from count twenty-four to count zero), referred to hereinafter as pulse sample time $T_{sp}$.

In a similar manner, the counter decoder 46 may, for example, contain a set of logic gates that will detect a single count that occurs during the pulse sample time $T_{sp}$. For the purpose of this description it is assumed that the single count of twenty-eight is detected (binary stages or orders $2^4$, $2^3$, and $2^2$ are set while neither stages $2^1$ or $2^0$ are set, as will be recognized by those skilled in the art); this signal is the aforementioned reference signal $S_r$. The reference signal $S_r$ is present for a relatively short period of time compared to the pulse sample time $T_{sp}$ and occurs about midpoint of the pulse sample time $T_{sp}$ as illustrated in FIG. 3.

Utilization of the pulse sample signal $S_p$ and the reference signal $S_r$ by other components of the present invention will now be described. It should be borne in mind, however, that the choice of 5-bit counter, a count detection of twenty-four or greater, and a count detection of twenty-eight are for purposes of describing the principles of the present invention only, and are not inflexible choices. Other values may be utilized in particular embodiments to suit particular requirements.

The data and operation control 48 is comprised of a set of logic gates and elements responsive to the signals received from the counter decoder 46, the output transducer amplifier 23, and signal transmission line 52 to generate and transmit other data and control signals over transmission channel 50 for use by other portions of the data handling system (not shown). In addition the data and operation control is responsive to the aforementioned data and count indication signals for transmitting data signals $S_d$ to one input of a logic OR gate 70 whereupon data signals $S_d$ are transmitted from that OR gate to the input transducer amplifier 21. The input transducer 18 will be caused to initiate acoustic signals indicative of data on the delay line 10. Data signals $S_d$ are transmitted to OR gate 70 at times other than the aforementioned pulse sample time $T_{sp}$.

During each pulse sample time $T_{sp}$ logic AND gate 76 is enabled by the pulse sample signal $S_p$. During this sample time $T_{sp}$ an electrical signal (described more fully below as delayed reference signal $S_{dr}$) received at the other input of the AND gate 76 from the output transducer amplifier 23 (indicative of an acoustic signal received at the output end 20 of the delay line 10) will cause a reset signal $R_s$ to be transmitted to the reset terminal 80 of the switch means 32. Receipt of reset signal $R_s$ will have no effect if the switch means is already in the reset state, but will have the effect of causing the switch means to change from its set state to its reset state if the switch means was in the set state.

Each reference signal $S_r$, which it will be recalled occurs on the twenty-eighth count of the counter, will pass through logic OR gate 70 to the input transducer amplifier 21, and to the set input terminal 42 of the switch means 32. Such reference signal $S_r$ will cause the switch means 32 to be placed in its set state if not already in the set state, and will have no effect on the switch means if it is already in the set state.

The reference signal $S_r$ to the input transducer amplifier 21 will cause initiation and transmission of an acoustic signal on the delay line 10, which then travels the length of the delay line 10. When received at the output end 20 of the delay line, the acoustic signal causes generation of a delayed reference signal $S_{dr}$ to logic AND gate 76. It will be recalled that the occurrence of a delayed reference signal $S_{dr}$ during the pulse sample time $T_{sp}$ or presence of pulse sample signal $S_p$ at the other input of AND gate 76 will result in transmission of a reset signal $S_r$ to the switch means' reset input terminal 80.

Thus it can be understood that the reference signal $S_r$ effects initiation of heating current to the delay line 10 and at the same time effects transmission of an acoustic signal on the delay line 10. After a period of time (transit time TT) the acoustic signal (reference pulse $P_r$) reaches the end of the delay line and effects turn off of heating current to the delay line.

As best illustrated in FIG. 3 when the delay line is too cold and thus has a fast transit time $TT_f$, reference signal $S_r$ effects turn on of the heating current at each count of twenty-eight and the reset signal $R_s$ causes turn off of the heating current at some point in time between the next succeeding count twenty-four and count twenty-eight. The heating current remains off for the short time period between turn off and the immediately following count of twenty-eight. It is to be noted that the heating current is thus applied to the delay line 10 for a period of time equal to the entire transit time $TT_f$ of the delay line.

The electrical current through the delay line 10 heats the delay line and causes physical expansion or elongation of the line. This in turn causes an increase in transit time of the delay line.

It may, and usually does, happen that heating of the delay line in the manner just described is somewhat more than required for perfect synchronization, i.e., the transit time $TT_s$ of the line is made slower than required for perfect synchronization with the clock. As best shown in FIG. 3, when such slow transit time $TT_s$ condition is encountered, the heating current is caused to be turned off at some point in time after count twenty-eight (turn on time), by the substantially delayed or slowed generation of reset signal $R_s$. It can be seen that the turn on period of time of the heating current under such conditions, is a very small period of time with respect to the total transit time $TT_s$ of the thus extra hot delay line. Only a very small, in fact minimal, amount of heat is thus furnished to the delay line.

Recalling that the delay line 10 is operated in an environment wherein the heat furnished to the delay line is dissipated to its environment, which remains cooler than the operating temperature of the delay line, it can be understood that the delay line will rapidly cool down so that its transit time $TT_s$ is once again just slightly less than a period of time equal to the time required for full counting of the counter 44. When this occurs, heating for the full transit time of the delay line occurs once again in the same manner as described previously.

It can thus be seen that the heating of the delay line 10 will take place in a manner that will cause its transit time to be substantially equal to the period of time required for a predetermined or full count of the counter.

A SECOND EMBODIMENT

In FIG. 2 there is illustrated a second embodiment of the present invention wherein the transit time of a first or slaved delay line 110 is synchronized with the transit time of a second or master delay line 210. In the FIG. 2 embodiment, the transit time of the master delay line 210 may be synchronized with a data handling apparatus (indicated in FIG. 2 by transmission lines 152 and 154) by any desired means, such as, for example, the previously described FIG. 1 embodiment. On the other hand, the master delay line 210 may be one whose transit time is not regulated but is enabled to operate asynchronously with the data handling apparatus. In either situation, synchronous or asynchronous operation with respect to a data handling apparatus, the transit time of the slaved delay line must be substantially synchronized with respect to the master delay line when the delay lines are operated in parallel.

In FIG. 2, the slaved delay line 110 is illustrated as having an input end 116 to which is operatively coupled an input transducer 118 and a current supplying amplifier 131. Associated with amplifier 131 is a common or ground connection 134a also indicated by means of ground symbol 134b as being connected to the output end 120 of the slaved delay line 110. Further an output transducer 122 and amplifier 123 are operatively coupled to an output end 120 of the slaved delay line. An input transducer amplifier 121 is operatively coupled to the associated input transducer 118.

A bistable switch means 132 controls application of heating current from the amplifier 131 to the slaved delay line 110 in the same manner as described in connection with switch means 32 of FIG. 1.

Means for placing the switch means 132 in the set and reset state, and thus control application of heating current to the slaved delay line 110 is accomplished in a manner similar to that described with reference to FIG. 1. The data and operation control 148 will, at particular instants of time (which instants need not be regularly recurring), transmit a reference signal $S'_r$ to two logic OR gates 170 and 190. Logic OR gate 170 thus passes the reference signal $S'_r$ to the input transducer amplifier 121. An acoustic signal is initiated on the slaved delay line 110. At the same time logic OR gate 190 passes the reference signal $S'_r$ to an input amplifier 221 associated with an input transducer 218 of the master delay line 210. An acoustic signal is thus initiated on the master delay line.

After the reference signal $S'_r$ is generated, the data and operation control 148 will be effective to cause transmission of data signals $S'_d$ to respective OR gates 170 and 190, each of which will pass the data signals on to their associated delay line input transducers 118 and 218. Acoustic signals indicative of data will be initiated on each delay line 110 and 210.

Shortly before the acoustic signal on master delay line 210, that was initiated by the reference signal $S'_r$, arrives at the associated output transducer 222, a pulse sample signal $S'_p$ is transmitted from the data and operation control 148 to one input of each of two logic AND gates 176 and 294 and remains for a pulse sample time period $T'_s$. In synchronous operation, the pulse sample signal $S'_p$ may, for example, be generated by a counter decoder as in the FIG. 1 embodiment. In asynchronous operation, the pulse sample signal $S'_p$ may be generated by logic gates in the data and operation control 148; for example, by detecting that no further data indicative signals are to be transmitted or received.

During the pulse sample time $T'_s$, the acoustic signal that was initiated on master delay line 210 by the reference signal $S'_r$ arrives at the output transducer 222 thereby causing a delay reference signal $S'_{dr}$ to be transmitted from output amplifier 223 to the other input of logic AND gate 294. Logic AND gate 294 thus transmits a delayed reference signal $S'_{dr}$ to the set input terminal 142 of the switch means 132. This causes the switch means to be placed in its set state, if not already in that state, and thus heating current will be turned on and furnished to the slaved delay line 110 in the manner previously described. The slaved delay line 110 elongates its transit time $TT'$ in the same manner as described in connection with the FIG. 1 embodiment.

Now, during the aforementioned pulse sample time $T'_{sp}$ that the enabling pulse sample signal $S'_p$ is furnished to logic AND gate 176, the acoustic signal that was initiated on the slaved delay line 110 arrives at the output transducer 122 and thus a slaved delayed signal $S'_{sdr}$ is transmitted to the other input of logic AND gate 176. This gate responds and transmits a slaved reset signal $R'_s$ to the reset input lead 180 of the switch means 132. This will cause the switch means to be placed in its reset state if not already in such state. Placing of the switch means in the reset state will cause turn off of heating current to the slaved delay line 110 and thus the delay line 110 will cool in the same manner as described in connection with the FIG. 1 embodiment.

If the transit time $TT'_s$ of the slaved delay line 110 is less than the transit time $TT'$ of the master delay line 210, the switch means will be placed in the set state (heating current to slaved delay line 110 will be turned on) during one pulse sample time $T'_{sp}$ and will be placed in the reset state (heating current to slaved delay line 110 is turned off) during the next succeeding pulse sample time as in the FIG. 1 embodiment. Thus heating current will be furnished to the slaved delay line 110 for a relatively long time, which time is equal or substantially equal to the transit time of the slaved delay line 110.

On the other hand if the transit time $TT'_s$ of the slaved delay line 110 is somewhat greater than the transit time $TT'$ of the master delay line 210, the switch means 132 will be set and reset during the same pulse sample time $T'_{sp}$. Thus the heating current will be supplied to the slaved delay line 110 for a period of time very substantially less than the transit time of the slaved delay line. The small amount of heat generated is far less than required to raise the temperature of the line. Instead, since the heat of the line is dissipated to its environment at a rate greater than the small rate of heat input, the line will become cooler, as in the FIG. 1 embodiment.

There has thus been shown and described a novel means and system for adjusting the transit time of an ultrasonic delay line to be in substantial synchronism with some reference source.

While the principles of the invention have been made clear in the illustrative embodiments, there will be obvious to those skilled in the art many modifications in structure, arrangement, proportions, the elements, materials and components, used in the practice of the invention, and otherwise, which are adapted for specific environments and operating requirements, without departing from these principles. The appended claims are therefore intended to cover and embrace any such modifications within the limits only of the true spirit and scope of the invention.

What is claimed is:

1. In combination with a signal transmission means having a signal transit time characteristic dependent upon its temperature;
   means for applying input signals sequentially to said transmission means;
   and means for receiving output signals from said transmission means;
   the improvement comprising;
   means solely responsive to selective ones of said input signals for effecting a temperature increase of said transmission means, and solely responsive to selective ones of said output signals for precluding said temperature increase.

2. In the combination according to claim 1 wherein:
   said temperature increase effecting and precluding means includes
   a source of electric current;
   means responsive to an electric current for adding heat to said transmission means;
   switch means in circuit with said source of current and said heat adding means, said switch means having two stable states, and being switchable between said states, said switch means being responsive to said selective ones of said input signals for switching from one of said states to the other of said states, and being responsive to said selective ones of said output signals for switching from said other of said states to said one of said states;
   said other of said states causing current flow in said current responsive means, and said one state precluding current flow in said current responsive means.

3. In combination;
   an ultrasonic delay line having an input end and an output end;
   said delay line having an acoustic signal transit time characteristic dependent upon the heat content of the line;
   said line being normally operated in an environment having a temperature less than the temperature of the line;
   a source of time sequential first electrical signals;
   means responsive to each of said first electrical signals for initiating an acoustic signal on said delay line at said input end;
   means responsive to the arrival of acoustic signals at the output end of said delay line to generate second electrical signals;
   a source of electrical current;
   means associated with said line being responsive to an electrical current for increasing the heat content of said line;
   bistable switch means switchable between a first state and a second state, said switch means being responsive to at least some of said first electrical signals for switching from said second state to said first state, and being responsive to at least some of said second signals for switching from said first state to said second state;
   said switch means when in said first state permitting electric current from said source to be applied to said associated means, and said switch means when in said second state precluding application of electric current from said source to said associated means.

4. In the combination according to claim 3 wherein said first electrical signals are time separated by a period of time greater than the transit time of said delay line when said delay line is at a temperature substantially equal to the temperature of said environment.

5. In the combination according to claim 3 wherein there is further included a signal handling and generating means operatively coupled with said delay line, said signal handling and generating means including said source of time sequential first electrical signals, and means for selecting which ones of said first and second signals will be applied to said switch means.

6. In the combination according to claim 3 wherein said source of time sequential first electrical signals includes a second acoustic delay line.

7. In the combination according to claim 3 wherein said associated means comprises an acoustic signal propagating material also resistant to the flow of electric current therethrough.

8. In the combination according to claim 3 wherein said source of first electric signals includes means for generating said first signals at a substantially regular rate.

References Cited

UNITED STATES PATENTS

| 3,209,286 | 9/1965  | Eveleth        | 333—30    |
| 3,277,381 | 10/1966 | Sullivan       | 328—56    |
| 3,355,681 | 11/1967 | Beurrier et al.| 333—18 XR |

FOREIGN PATENTS

| 781,902 | 8/1957 | Great Britain. |
| 813,591 | 5/1959 | Great Britain. |

ARTHUR GAUSS, *Primary Examiner.*

STANLEY D. MILLER, *Assistant Examiner.*

U.S. Cl. X.R.

330—18, 30; 307—293